May 11, 1965 R. A. KURTZ ETAL 3,183,086
METHOD OF MAKING POROUS BODY WITH IMPERVIOUSLY SEALED SURFACE
Filed May 3, 1963

INVENTORS:
RONALD A. KURTZ
ANTHONY D. KURTZ
AND WILLIAM H. HERZ
BY Edward T. Connors
ATTORNEY

United States Patent Office 3,183,086
Patented May 11, 1965

3,183,086
METHOD OF MAKING POROUS BODY WITH IMPERVIOUSLY SEALED SURFACE
Ronald A. Kurtz and Anthony D. Kurtz, Englewood, N.J. and William H. Herz, Yonkers, N.Y., assignors to Kulite Tungsten Co., Ridgefield, N.J., a partnership
Filed May 3, 1963, Ser. No. 277,763
6 Claims. (Cl. 75—222)

The present invention relates to porous refractory metal articles and to the method of manufacture thereof, and more particularly to porous metal bodies having an imperviously sealed outer surface and particularly suitable for fluid control means.

The sealed porous metal bodies are suitable, among other purposes, for applications requiring precise reproducible directional flow characteristics and in which the body is sealed so as to prevent outflow of fluid in any other direction than in the direction of the desired flow. Included are air bearing applications as for gyros, air bearing surfaces, ion generators, fluid and gas filters, apparatus for the precision measurement of the drip of fluids and for metering devices, and other devices requiring a precisely controlled flow of fluid medium.

Heretofore, in some cases, porous paper filters have been used to provide the desired fluid flow in air bearing gyros, but it has been difficult to achieve the desired closely controlled rate of flow of the air. Porous bodies with sealed sidewalls have been made by other methods, such as, by plastic encapsulation, electro deposition or vapor deposition of the porous body, or by applying plastic or metal sleeves thereto. Some of these methods are difficult to perform in order to provide an impervious seal, in other cases by reason of the method of manufacture foreign matter is allowed to enter the pore structure thus affecting the permeability and rate of fluid flow therethrough in varying degrees. It is difficult or impossible to remove such internal contamination and thus the porous body is greatly reduced in efficiency.

The present invention aims to overcome the difficulties and disadvantages of prior fluid flow controlling means by providing a method of manufacture and a porous body having uniform permeability and providing a controlled rate of fluid flow therethrough.

In accordance with the invention the porous body is made of a powdered refractory material which is compressed into the desired configuration, thereafter sintered, and the outer surface melted into an impervious skin or seal by electron beam melting. The porous body and/or the electron beam are moved with respect to each other so that the entire outer surface of the sides of the porous body is successively fused. Due to the controllability of the electron beam process, very close control of the fused skin depth is achieved. When the fused area solidifies a pore-free solid skin results which is integral with the porous body.

The sealed porous body made in accordance with the invention is advantageous in that the outer skin is of the same composition as the porous media thus eliminating the possibility of chemical or metallurgical reaction therebetween. Further, the skin and core have the same coefficient of expansion thus reducing the possibility of damage during thermal cycling.

An object of the invention is to provide fluid flow control means with precise reproducible fluid flow characteristics.

Another object of the invention is to provide a sealed porous body which is simple and economical in manufacture, efficient in operation, and durable in use.

Other objects and advantages of the invention will be apparent from the following description and from the accompanying drawing, which shows by way of example, an embodiment of the invention.

Figure 1:
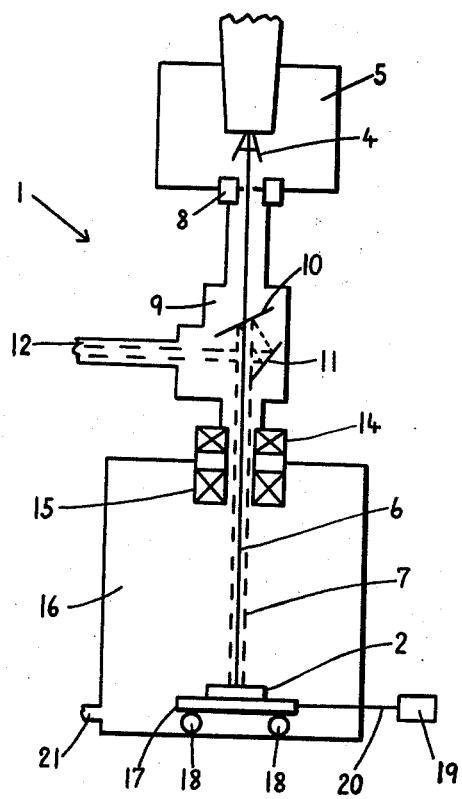
FIGURE 1 is a schematic drawing of an electron beam welder with a porous body in position for the formation of an impervious skin.

Referring to the drawings there is shown an electron beam welder 1 with a workpiece 2 in position.

The electron beam welder 1 is conventional and forms no part of the present invention. In a typical electron beam welder 1 there in included an electron beam gun 4 which is positioned in a chamber 5. A line 6 generally indicates the path of a beam of electrons emitted by the electron gun 4 towards a workpiece 2. The beam 6 passes through a diaphragm 8 into a chamber 9 in which are placed mirrors 10 and 11 to reflect an image of the workpiece 2 received along the path 7 to an optical viewing system which is shown broken away at 12. The mirrors 10 and 11 may have central openings or be otherwise constructed as is well known in the art. After passing the mirrors 10 and 11, the beam 6 passes through a magnetic lens 14 and a deflection coil 15 into a chamber 16, in which is placed the workpiece 2.

In order that the workpiece 2 may be manipulated while in the vacuum chamber 16 it may be placed on a movable platform 17 carried by rollers 18 or the like and which may be manipulated into various positions along the path of the beam 6 by a control 19 of an actuating mechanism 20. In other constructions the workpiece may be held and manipulated directly by the actuating mechanism 20. If desired, the mechanism 20 may be so arranged as to rotate and axially move the workpiece 2 in a uniform manner, either independently or in conjunction with the action of the deflection coil 15, so that a skin of even thickness is formed on the surface of the workpiece 2. The entire interior of the welder 1 is evacuated by a vacuum system (not shown) connected as indicated at 21.

Figures 2, 3:
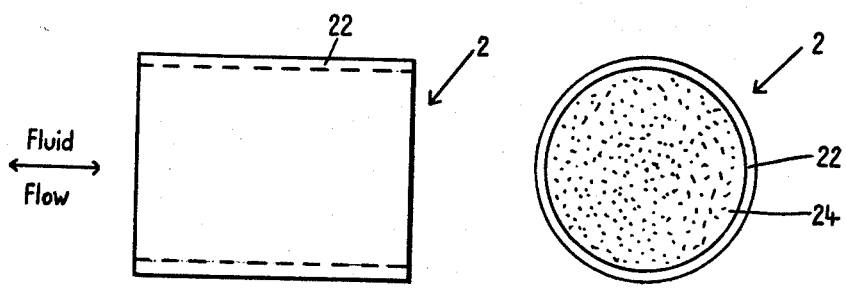
FIGURE 2 is a side view of a typical sealed porous body with its outer cylindrical surface sealed.
FIGURE 3 is an end view of the porous body shown in FIGURE 2.

The finished workpiece 2, as illustrated in FIGURES 2 and 3 is in the shape of a cylindrical plug and has its cylindrical surface formed into an impervious skin 22, the center portion 24 being porous. Alternatively other body shapes may be chosen.

The workpiece 2 may be made of any suitable material which may be powered and sintered to form a porous body. Among the materials suitable are tungsten, tantalum, molybdenum, columbium, zirconium, cobalt, appropriate ceramic materials, stainless steel, nickel, monel and other materials known in the art.

The invention will be particularly described with reference to the use of tungsten as setting out an example which may be followed with appropriate modifications in the use of other materials.

It has been found that in using tungsten, the particle size may range from about ½ micron–50 microns or more. The exact range between the limits given will be determined to a large extent by the desired porosity to give the flow rates required.

By way of example, tungsten powder having a particle size range of from about ½ to 5 microns, when processed will result in lower flow rates as compared to workpieces made from powder having a particle size range of 6–10 microns. Likewise, workpieces having a particle size range of 6–10 microns would have lower flow rates than workpieces made from larger particle tungsten powder having a size range of 11–20 microns and so forth. It is assumed that all workpieces would be processed under identical conditions.

The flow rate therefore can be varied to a considerable extent by the range of particle sizes used. Other factors affecting the flow rate of the workpieces are the compacting pressure, the sintering temperature and the sintering time. For any particular flow rate, all of the above factors must be closely controlled to achieve the uniformity required.

The desired amount of tungsten powder is placed in a suitable die and pressed under hydraulic pressure. The pressure may vary between about 15,000 p.s.i. to 100,000 p.s.i. The pressed pieces are then packed in boats which are slowly moved through a reducing atmosphere such as $H_2$ in the suitable furnace having provision for controlling the temperature, and sintered. Likewise, workpieces may be sintered in an inert atmosphere such as argon or nitrogen or in a vacuum. The workpieces are sintered at temperatures from about 1400–2100 degrees C. for times ranging from about one half to 24 hours to achieve the desired flow rates.

After being sintered, the workpieces are machined to any desired configuration and are then placed in an electron beam welder. The electron beam is defocused and made to oscillate along the length of the sample which in turn is rotated. Suitable voltages and currents are used and the workpieces are rotated at the desired rotational speed and linear motion to produce a uniform skin thickness. Typical skin thicknesses in the range of .001 to .002 inch are achieved.

While the invention has been described and illustrated with reference to a specific embodiment thereof, it is apparent that other embodiments may be resorted to without departing from the invention. Therefore, the form of the invention set out above should be considered as illustrative and not as limiting the scope of the following claims.

We claim:
1. The method of making a fluid permeable refractory article of precise reproducible flow characteristics and uniform fused skin depth comprising molding powdered material particles into a desired body shape by compacting said particles, sintering said body, and thereafter applying an electron beam to the surface of the body leaving free a portion of said surface for the passage of fluid through said refractory article thereby fusing the surface particles together forming an impervious surface thereon.

2. The method according to claim 1 in which the powdered material is selected from the group including tungsten, tantalum, molybdenum, columbium, zirconium, and cobalt.

3. The method in accordance with claim 1 in which the particle size of the powdered material ranges between 0.5 and 50.0 microns.

4. The method in accordance with claim 1 in which the compacting pressure ranges between fifteen to one hundred thousand pounds per square inch.

5. The method in accordance with claim 1 in which the compacting pressure ranges between twenty-five thousand and sixty thousand pounds per square inch.

6. The method of making a fluid permeable powdered metal article comprising providing powdered tungsten having a particle size from .5 to 50 microns, compacting the particle to form a pressed body of the desired configuration using a compacting pressure ranging between 15,000 to 100,000 pounds per square inch, sintering the formed body at a temperature between 1400 to 2100 degrees C. for a period ranging between one half and 24 hours, and thereafter applying an electron beam to the surface of the body leaving free a portion of said surface for the passage of fluid through said refractory article thereby fusing its surface particles together so as to form an impervious skin.

References Cited by the Examiner
UNITED STATES PATENTS

| | | | |
|---|---|---|---|
| 2,215,723 | 9/40 | Jones | 75—208 |
| 2,220,641 | 11/40 | Davis | 75—200 |
| 2,839,397 | 6/58 | Cavanagh | 75—222 |
| 2,997,777 | 8/61 | Davies | 29—182 |

CARL D. QUARFORTH, Primary Examiner.

REUBEN EPSTEIN, Examiner.